United States Patent
Singer et al.

(10) Patent No.: US 9,279,738 B1
(45) Date of Patent: Mar. 8, 2016

(54) METHOD AND APPARATUS FOR DETECTING AND MONITORING OIL SPILLS AND LEAKS

(71) Applicants: Jerome R. Singer, Berkeley, CA (US); Glen Stevick, Berkeley, CA (US)

(72) Inventors: Jerome R. Singer, Berkeley, CA (US); Glen Stevick, Berkeley, CA (US)

( * ) Notice: Subject to any disclaimer, the term of this patent is extended or adjusted under 35 U.S.C. 154(b) by 0 days.

(21) Appl. No.: 14/630,021

(22) Filed: Feb. 24, 2015

(51) Int. Cl.
*G01V 5/00* (2006.01)
*G01M 3/38* (2006.01)
*G01V 8/00* (2006.01)

(52) U.S. Cl.
CPC ... *G01M 3/38* (2013.01); *G01V 8/00* (2013.01)

(58) Field of Classification Search
CPC .................................................. G01V 8/00
USPC ........................................... 250/253
See application file for complete search history.

(56) References Cited

U.S. PATENT DOCUMENTS

2008/0225273 A1* 9/2008 Ershov ................. G01N 21/39
356/73

OTHER PUBLICATIONS

Iseki et al. "A portable remote methane sensor using a tunalble diode laser" Meas. Sci. Technol. vol. 11, pp. 594-602, 2000.*

* cited by examiner

*Primary Examiner* — David Porta
*Assistant Examiner* — Meenakshi Sahu
(74) *Attorney, Agent, or Firm* — Howard Cohen

(57) ABSTRACT

A leak alarm system for a petroleum pipeline includes one or more detectors installed in the ground adjacent to a pipeline, each detector having a tubular enclosure with a diode light source and photosensor located at the opposed end of the tube. The tubular enclosure is fabricated of a microporous material that has microfiltration properties: it is hydrophobic, so that soil water will not enter the enclosure, but also oleophilic to enable petroleum and related substances migrate through the material of the tubular enclosure and accumulate therein. The petroleum-like materials scatter the beam and diminish the sensor signal, causing a leak alarm signal to be generated.

12 Claims, 3 Drawing Sheets

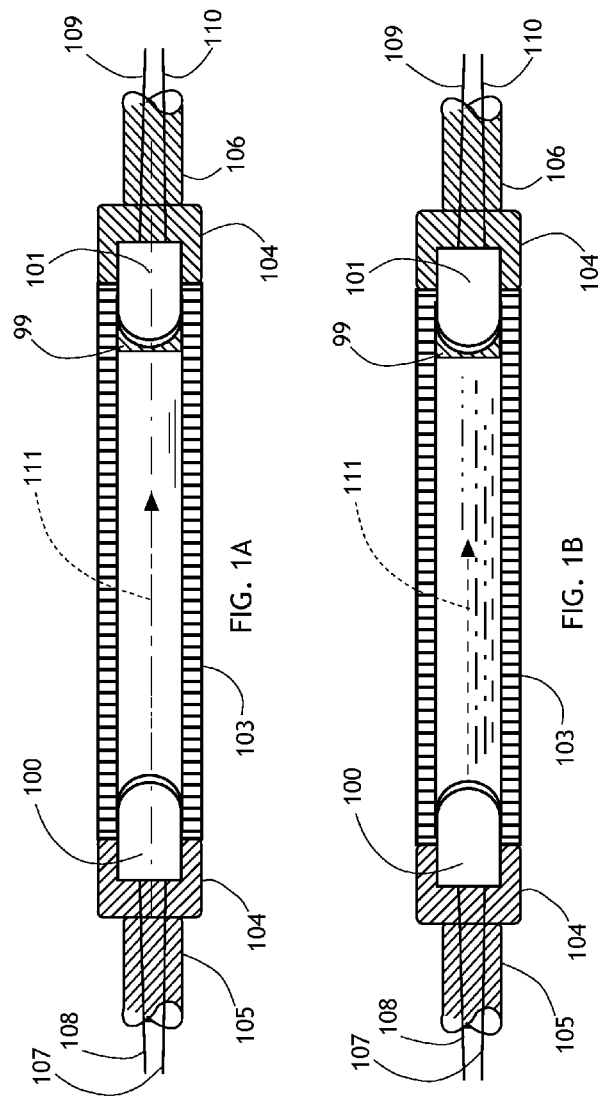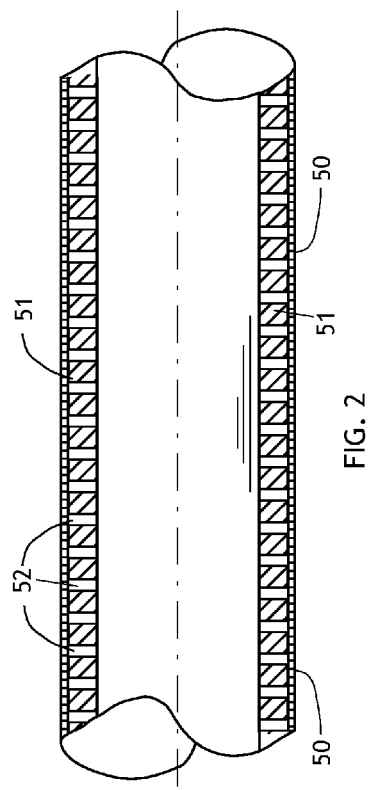

METHOD AND APPARATUS FOR DETECTING AND MONITORING OIL SPILLS AND LEAKS

CROSS-REFERENCE TO RELATED APPLICATIONS

Not Applicable.

FEDERALLY SPONSORED RESEARCH

Not applicable.

SEQUENCE LISTING, ETC ON CD

Not applicable.

BACKGROUND OF THE INVENTION

1. Field of the Invention

This invention relates to leak detectors and, more particularly, to leak detectors for pipelines and tanks carrying petroleum products.

2. Description of Related Art

A persistent problem that plagues steel pipelines, (as well as tanks, and other vessels), is corrosion. Thousands of miles of oil pipelines are 75 or more years old. These are steel, and they are constantly corroding. Corrosion is a non-uniform process. Small and large corrosion holes appear at random places on pipes. There are various reasons: One is the non-uniformity of the steel due to localized impurities which cause electrolytic action and erosion of the steel. Another is the nature of oils which may contain water, sulfides, chlorides, and other oxidizing agents which collect locally to corrode piping. Deadhead pipelines, (pipes used intermittently) are particularly susceptible to local corrosion holes. There are many other factors that come into play, and the result is that practically all pipeline sections are observed to reach their end-of-life status with corrosion showing as small or large holes. That fact makes it difficult to statistically analyze the health status of a pipeline or a tank.

A reasonably rapid response system for monitoring and detecting oil spills and leaks would forestall oil spill losses, and it would prevent disasters. A few years ago, one such spill disaster caused enormous ecological damage and nearly a billion dollars of cleanup expenses. Smaller, very costly spills occur frequently, and oil losses also add up. Several patents describe methods of detecting oil spills. Some describe Infrared photography, a commercially available detection/monitoring system employs a cable which is placed under the pipeline to detect and monitor oil spills. Generally, the cost of placing a cable under an existing pipeline is prohibitive because pipelines are mainly underground and the excavation process is very expensive. The present invention is designed to be economically utilized for existing pipelines as well as new pipelines, and to provide means of detecting early stage leaks.

U.S. Pat. No. 4,029,889 by Mizuochi-Shoken describes a coaxial cable encased in a coating of petroleum permeable plastic which is hydrophobic: it will not allow water to penetrate the coating. When oil penetrates the coating, the capacitance between the cable conductors changes, and the change can be measured by an instrument such as a time domain reflectometer instrument. Various versions of this system are now manufactured by companies such as Raychem and Pentair-TraceTek and are presently commercially utilized for oil spill detection. This system has the disadvantage of requiring a system to measure small capacitance changes in a cable, and of locating the oil leak region of the cable. The present invention is designed to provide a simpler detection method and to avoid the complication of measuring capacitance changes. The output of our detector system is the closure of a contact or a voltage pulse either of which is much less expensive to implement in a detection system.

BRIEF SUMMARY OF THE INVENTION

The present invention delineates a system for installing a monitoring system and a method of providing local detectors for that system. Most oil pipelines are underground. Total excavation is not practicable because of cost. Therefore, our design provides a method and procedure of installing effective oil leak sensors strategically spaced along the pipeline. In order to accomplish that goal, the sensors must be relatively small, inexpensive, and easily installed.

One or more detectors are installed in the ground adjacent to a pipeline to be monitored, each detector including a tubular enclosure with a radiation source such as a laser diode mounted therein to direct a beam along the axis of the lumen of the enclosure. A radiation detector such as a photosensor is located at the opposed end of the tubular enclosure to receive the radiation through the lumen. The tubular enclosure is fabricated of a microporous material that has microfiltration properties: it is hydrophobic, so that soil water will not enter the enclosure, but it is also oleophilic to enable petroleum and related substances migrate through the material of the tubular enclosure and accumulate therein. The petroleum-like materials that accumulate in the lumen scatter the beam and degrade the transmission of the radiation through the lumen. In addition, the material that forms the sidewall of the tubular enclosure, once it absorbs petroleum-based substances, may alter its index of refraction. As a result, more of the laser beam escapes through the sidewall, further diminishing the signal of the photosensor.

A simple microprocessor-based circuit is used to pulse the photodetector system to operate periodically, thereby saving a great amount of battery capacity. In addition, the microprocessor may be programmed with minimum limits for the photosensor signal to indicate an alarm condition.

BRIEF DESCRIPTION OF THE DRAWING

FIGS. 1A and 1B are cross-sectional longitudinal views of the petroleum sensor of the invention, shown empty and laden with petroleum-based material.

FIG. 2 is an enlarged cross-sectional view of the tubular housing of the petroleum sensor of the invention.

DETAILED DESCRIPTION OF THE INVENTION

Figure 3:
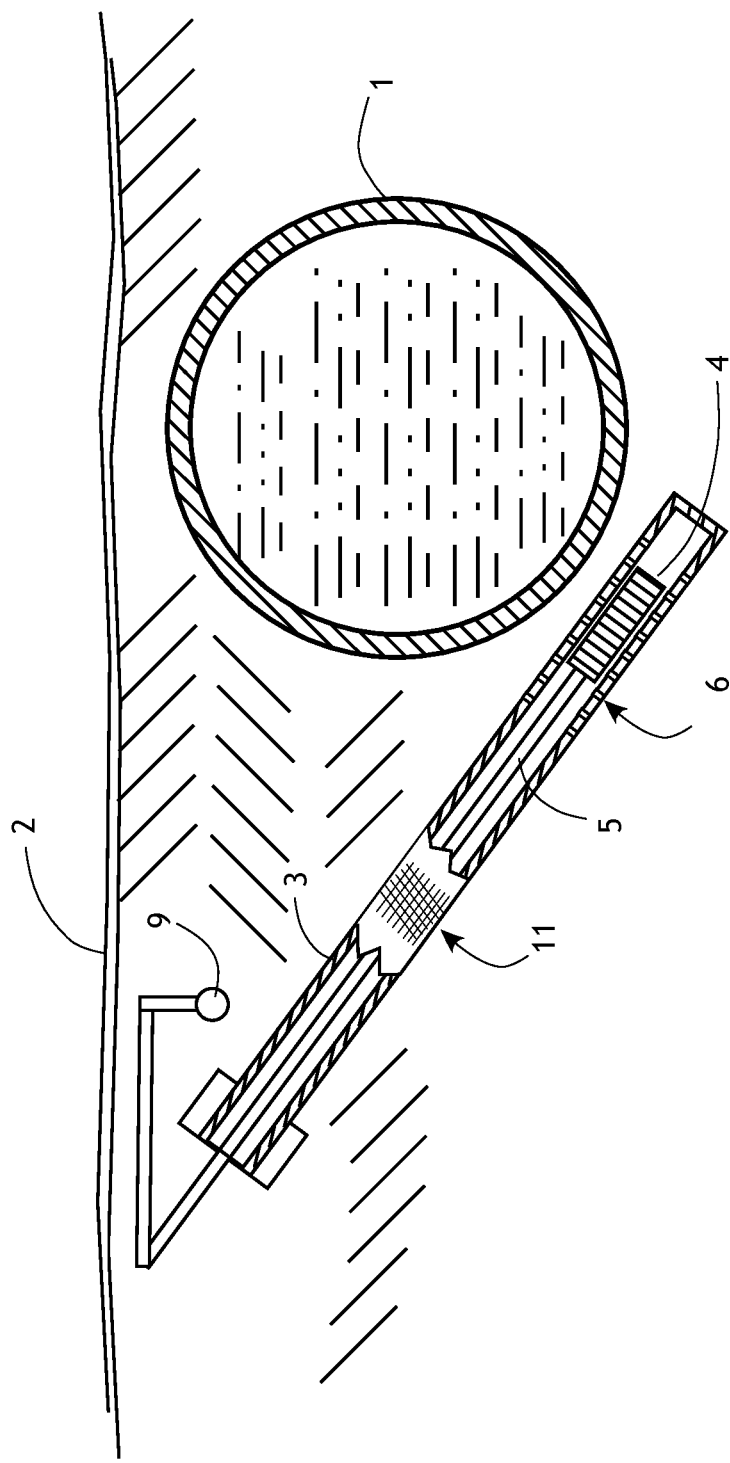
FIG. 3 is a cross-sectional elevation depicting the petroleum sensor of the invention installed in conjunction with a typical underground pipeline.

The present invention generally comprises a leak detection system for pipelines and tanks that contain petroleum or petroleum products. With regard to a schematic of the detector system shown in FIG. 1A, an emitter 100 provides a radiation source. The simplest design uses a laser such as a laser diode as a radiation source. However, other radiation sources, for example, an LED, is also practicable. We shall use the word laser to encompass all such radiation sources. The radiator sends its radiation within the tubular enclosure 103 to be detected by a detector 101 which detects the radiated energy. Detector 101 is a photosensor that is sensitive to the wavelength of the radiated energy. The filter 99 limits the level of radiation reaching the sensor 101 since the laser light is generally too bright and may saturate the sensor. The filter 99 will usually be a simple density filter or may also incorporate a specific wavelength band pass if convenient. The entire cost of manufacturing this sensor with an associated microprocessor is very low. The low cost factor provides a significant inducement to utilization for the early detection of oil spills.

The enclosure 103 is essentially a filter tube which is permeable to petroleum and petroleum products and rejects water. It is fabricated using a hydrophobic and oleophilic material that acts as a filter. The filter rejects water and admits petroleum products through the enclosure due to having been manufactured with the correct pore size, (typically some microns), to allow petroleum products to pass through the pores. Such filter materials are commercially available, for example, polypropylene and PTFE filters. A commercial microporous filter material suitable for this application is commercially available from several companies; examples are the Raychem Corporation, and the Trace Tek-Pentair corporation. As shown in FIG. 2, the enclosure tube 51 has a sidewall with micropores 52 (not to scale). The tube 51 is typically flexible and, due to the straight path needed for the laser radiation, needs to be held rigid and linear. It is easily maintained rigid using a length of a plastic angle or a very snug fitting sleeve or tube 50 such as is shown in cross section in FIG. 2 which is open to oil because it has many apertures to allow the oil to freely enter and permeate the tube 51.

The water and oil proof seals 104 is used to seal the cables 105 and 106 from the entry of any undesirable material, and provide a liquid proof seal to the cables 105 and 106 which carry wires to provide current to the radiation source.

The sealed waterproof cable 105 covers the two wires 107 and 108 which are connected to a regulated source of power which drives the radiation emitter 100. Likewise, the sealed waterproof cable 106 covers the two wires 109 and 110 which go to a detection circuit. The radiation from the emitter to the detector is indicated by the dotted line 111.

Figure 4:
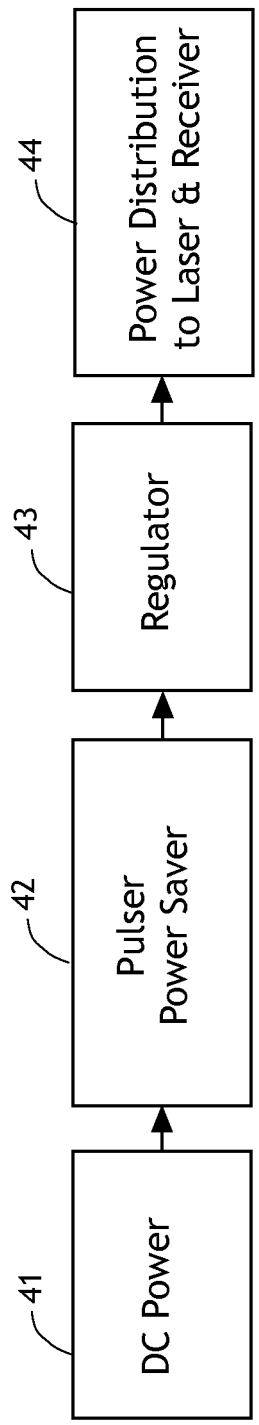
FIG. 4 is a functional block diagram showing the steps taken to activate the petroleum sensor of the invention.
Figure 5:
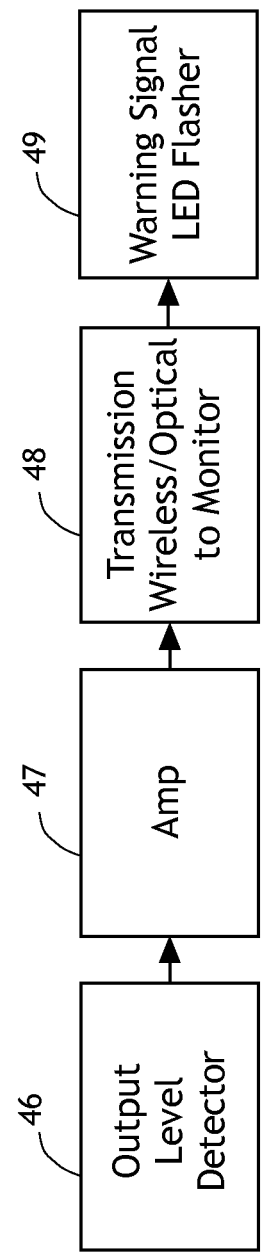
FIG. 5 is a block diagram showing the steps taken to generate an alarm signal when the petroleum sensor detects a petroleum substance.

The principle of petroleum or petroleum product detection is embodied in FIG. 1A. The radiation 111 from the emitter 100 is directed to the radiation detector 101. When petroleum or a petroleum product enters into the lumen of the oil permeable filter tube 103, the radiation is scattered and absorbed which significantly reduces the radiation energy arriving at the detector 101. That loss of signal is measured by a simple microprocessor circuit, and which in turn generates an alarm signal. The electronic elements required are straightforward logical elements familiar to any electronic engineer. A block diagram of the steps taken to generate the laser beam is shown in FIG. 4, and FIG. 5 shows the steps taken to receive the laser beam and generate an alarm signal when necessary.

The most practicable system of providing power through wires wires 107 and 108 is to use a microprocessor powered by a long life battery, such as a Li-Ion battery, or other DC power source 41. The microprocessor provides itself a pulser power saver function 42 (sleep mode) for minimizing power consumption, and powers the laser source 100 periodically in a very low duty cycle to save power—as an example, for one second every 15 minutes. The microprocessor receive the signal from the photosensor 101 and transmit that signal to an alarm system, for example, a flashing LED and/or a wireless transmission system to a monitoring station. Many microprocessor systems are commercially available and are readily assembled and programmed by an electronic engineer. For multiple sensor installations that cover a pipeline or tank, each microprocessor is preferably given a specific unique digital address so that each sensor is located through its individual microprocessor address. Anyone skilled in the art could assemble and program the simple program needed.

The method of operation is that the laser 100 flashes every period, for example, one second every fifteen minutes, and the photosensor 101 generates a one second signal each time. The reception of that signal indicates that the path of the radiation from the laser to the sensor 101 is unobstructed. The reception of the photosensor signal indicates that the system is in operation, and that signal is transmitted to a monitoring system.

When there is an oil spill, the oil will penetrate the permeable tubing 103 and the oil will scatter and absorb the laser beam radiation 111, as shown in FIG. 1B. The accumulated petroleum-based substance(s) will block the laser radiation from reaching the photosensor 101 and the one second signal will not be received by the monitoring system. The lack of photosensor signal indicates to the monitor that either that the system in not functioning or that oil has penetrated the tubing. In order to provide a positive oil spill alarm, therefore, two or more sensor systems should be employed in each locality. When two or more independent sensors indicate an alarm by not sending out their periodic pulses, that is a positive indicative of an oil spill. The positive spill indication signal is sent via a microprocessor to a base station.

In order not to overload the number of signals to the base station, when there are many sensor systems along pipeline, the local microprocessor associated with each sensor of FIG. 1 may be programmed to monitor the one second signals, and when there is an indication of an oil spill, as indicated by the loss of the one second or so laser photoreceptor signal, the local microprocessor transmits the oil spill alarm signal, along with its specific identification code to the monitoring base station.

With reference to FIG. 4, the method of the sensing procedure as an example, is as follows: DC power 41 is applied to a pulser power saver 42, which emits a short pulse in a low duty cycle, every fifteen minutes or so, for a second or so. (The exact timing is up to the pipeline manager). The pulse is sent through a regulator 43 to standardize the voltage and power, and then distributed (step 44) to the laser diode 100 and photosensor 101. The photosensor 101 generates an output pulse in response to the laser pulse, and the output pulse goes through a level detector 46 to amplifier 47 (FIG. 5). In step 48 that pulse voltage signal is sent every fifteen minutes to the pipeline monitoring station. When there is an oil spill, oil will enter the permeable tube 103. Oil is both an absorbant and scatterer of the laser beam 111. As a result of the oil interfering with the laser beam 111 (FIG. 1B), the periodic pulsed signal will stop.

When the monitoring station does not receive the standard periodic pulse signal, there are two possibilities:

A. The system is not functioning due to power failure, or physical or electronic damage. To overcome that false positive oil spill signal, and improve the confidence level, two or more sensing units can be installed, (FIG. 1 sensors) closely spaced. The redundancy will provide a more confident positive oil spill signal.

B. The system is functioning and there is an oil spill. Further confirmation may be achieved by receiving no pulse signals from redundant sensors nearby.

In either case the system goes to step 49 and emits a warning signal, which may include a visual LED flashing light, an automatic warning signal to service personnel, and the like.

The oil spill detection system is straightford. When in operation, pulse signals are sent, for example, once every 15 minutes, and two or more neighboring sensing systems send these pulses to the monitoring station. The signals are confirmation that the system is in operation. When the pulse signals stop, then that is either an oil spill signal or a signal that the system has become inoperable. To confirm that it is a positive oil spill, two or more neighboring sensors, (FIG. 1 sensors) may be monitored together to provide a clear indication of a positive oil spill.

This system is very low cost, probably a few dollars per sensing station. In addition, installations are very simple both for old and new pipelines. The major cost is putting them into place in the field. In the following section, economical installation procedures are described.

For existing pipelines as well as new pipelines, which are mainly underground, the installation of oil spill sensors is an afterthought. We describe here a method and procedure for installing an oil spill monitoring system for underground pipelines. FIG. 3 shows a underground cross section with a schematic view of the pipeline 1 in cross section, the underground pipeline 1 being buried below ground level 2. A post hole digger may be used to drill obliquely under the pipeline 1 to enable the placement of a plastic pipe section 3. The plastic pipe 3 should be completely permeable to liquids, and have small openings 6 and fine screening 11 to admit liquids but prevent soil from entering the pipe 3. The pipe 3 is to be installed in a configuration which permits the oil sensor to be placed below or near the pipeline advantageously in a position to sense oil leakage from the pipeline, as shown in FIG. 3. The sensor system 4 of FIG. 1 is supported in the pipe 3, and is designed to float in water. Floating is necessary in the event that a great deal of rain water may be in the vicinity.

The sensor 4 secured within the pipe section 3 is connected to a shallow buried cable 9 which provides access to power and communications with the monitoring base station. Alternatively, component 9 may comprise a housing enclosing a protecting the microprocessor and power supply for the individual sensor station, which may communicate with the monitoring base station via radio link using standard transmission protocols.

The system is designed to enable the detection of oil leaks in existing pipelines without having to excavate to place oil leak sensors under the pipeline. Due to the fact that the sensors may be installed using "post hole" diggers, this leak detection system is an inexpensive method of providing detection/monitoring of existing pipelines. By using the sensors of FIG. 1, and using the installation configuration described in FIG. 3, we are able to solve the problem of instrumenting existing pipelines for spill detection/monitoring at low cost.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A leak detector for petroleum-based substances, including:
   a tubular enclosure having an open lumen therein;
   a radiation source in said tubular enclosure emitting a beam along said lumen;
   a radiation sensor in said tubular enclosure arranged to receive said beam and generate a detector signal;
   said tubular enclosure being formed to be hydrophobic and oleophilic, whereby petroleum-based substances may penetrate said tubular enclosure and accumulate in said lumen to block said beam and stop said detector signal.

2. The leak detector of claim 1, wherein said radiation source includes a laser diode, and said radiation sensor includes a photosensor capable of generating said detector signal in response to light from said laser diode.

3. The leak detector of claim 2, further including a pipe enclosing said tubular enclosure, said pipe having openings to admit liquids therein.

4. The leak detector of claim 3, wherein said pipe is installed with a first portion thereof extending beneath a vessel containing petroleum-based substances.

5. The leak detector of claim 4, wherein said pipe is buried underground adjacent to said vessel and oriented obliquely downwardly with said first portion lowermost.

6. The leak detector of claim 1, further including a structural component for maintaining said tubular enclosure in a linear disposition.

7. The leak detector of claim 6, wherein said structural component includes a rigid linear sleeve extending about said tubular enclosure.

8. The leak detector of claim 1, wherein said tubular enclosure is disposed obliquely so that any petroleum-based substances will accumulate in one end of said lumen and block said beam.

9. A method for detecting leaks of petroleum-based substances contained in a closed vessel, including the steps of:
   providing at least one tubular enclosure formed of a material that is hydrophobic and oleophilic and placing a diode light source and a photosensor in said tubular enclosure, said photosensor disposed to receive light from said light source and generate a detector signal;
   placing said tubular enclosure adjacent to the closed vessel to be exposed to leaked liquid from said vessel;
   monitoring said detector signal and generating a leak alarm signal when said light source is operated and said detector signal is not received.

10. The method for detecting leaks of petroleum-based substances of claim 9, further including the step of operating said diode light source for a brief period and reiteratively in periodic fashion, said leak alarm signal being generated only if said detector signal is not received during said brief periods.

11. The method for detecting leaks of petroleum-based substances of claim 9, further including providing a plurality of said tubular enclosures distributed about the perimeter of said vessel, and said monitoring and generating step includes generating a leak alarm signal when said light source is operated and said detector signal is not received from two or more of said photosensors.

12. The method for detecting leaks of petroleum-based substances of claim 9, further including the step of providing a pipe section having perforations in the sidewall thereof, placing said tubular enclosure within said pipe section, and burying said pipe section underground beneath said vessel.

* * * * *